US012721258B2

(12) United States Patent
Clements et al.

(10) Patent No.: US 12,721,258 B2
(45) Date of Patent: Sep. 1, 2026

(54) ALL-ELECTRIC REEL-TYPE TURF VEHICLE

(71) Applicant: TEXTRON INC., Providence, RI (US)

(72) Inventors: Jamie M. Clements, Ipswich (GB); Robert Johns, Ipswich (GB); Fahad Harith, Ipswich (GB)

(73) Assignee: TEXTRON INNOVATIONS INC., Providence, RI (US)

( * ) Notice: Subject to any disclaimer, the term of this patent is extended or adjusted under 35 U.S.C. 154(b) by 407 days.

(21) Appl. No.: 18/498,555

(22) Filed: Oct. 31, 2023

(65) Prior Publication Data

US 2024/0138292 A1 May 2, 2024

Related U.S. Application Data

(60) Provisional application No. 63/421,451, filed on Nov. 1, 2022.

(51) Int. Cl.
*A01D 34/37* (2006.01)
*A01D 34/44* (2006.01)
*B60L 50/60* (2019.01)

(52) U.S. Cl.
CPC ............. *A01D 34/37* (2013.01); *A01D 34/44* (2013.01); *B60L 50/66* (2019.02)

(58) Field of Classification Search
CPC ................................ A01D 34/37; A01D 34/44
See application file for complete search history.

(56) References Cited

U.S. PATENT DOCUMENTS

2012/0159916 A1* 6/2012 Ishii ......................... B60L 58/40 56/10.2 G
2020/0245560 A1* 8/2020 Legault ................. B60W 20/15
2022/0151141 A1* 5/2022 Nebel .................... A01D 69/02

FOREIGN PATENT DOCUMENTS

CA 1115404 A * 12/1981 ............... H05K 7/16
CN 105644375 A * 6/2016 ................ B60L 8/00
EP 1588602 B1 * 4/2007 ........... A01D 75/306
JP 2017099315 A * 6/2017
JP 2017184360 A * 10/2017
WO WO-2021071655 A1 * 4/2021 ............ H02J 7/0063

OTHER PUBLICATIONS

English translation of JP-2017099315-A (Year: 2017).*
English translation of JP-2017184360-A (Year: 2017).*
English translation of CN-105644375-A (Year: 2016).*

* cited by examiner

*Primary Examiner* — Claude J Brown
(74) *Attorney, Agent, or Firm* — Sandberg Phoenix & von Gontard, P.C.

(57) ABSTRACT

An all-electric turf vehicle, wherein the vehicle comprises a chassis; a plurality of ground engaging wheels operatively connected to the chassis, wherein at least one of the ground engaging wheels is a steerable wheel; a plurality of electric wheel drive and tractions motors, wherein each electric wheel drive and tractions motor is operatively connected to a respective one of the plurality of ground engaging wheels and is structured and operable to deliver motive power to the respective ground engaging wheel; a plurality of turf cutting units; and an operator station. The operator station comprises a seat in which a vehicle operator can be seated; and a control and support arm pivotally movable so that the control and support arm can be positioned to not obstruct a line of sight of the vehicle operator to an outer edge of an outermost of the plurality of cutting units.

19 Claims, 8 Drawing Sheets

ALL-ELECTRIC REEL-TYPE TURF VEHICLE

CROSS-REFERENCE TO RELATED APPLICATIONS

This application claims the benefit of U.S. Provisional Application No. 63/421,451, filed on Nov. 1, 2022. The disclosure of the above application is incorporated herein by reference in its entirety.

FIELD

The present teachings relate to turf maintenance vehicles, and more particularly to an all-electric fairway mower.

BACKGROUND

The statements in this section merely provide background information related to the present disclosure and may not constitute prior art.

Currently most known reel type turf mowers, commonly used for cutting, grooming and maintaining grass at golf courses, sporting venues, parks, consumer lawns, etc., utilize internal combustion engines to provide motive force to propel the mowers. Such known reel type turf mowers also typically include hydraulic systems and motors to perform various operations of the respective mowers, such as raising, lowering and driving one or more grass cutting reel assembly of the mower. Implementation of such internal combustion engines and hydraulic systems require that the mowers further include various controllers, fuel and hydraulic fluid storage tanks and hoses, and various other related components that increase the number of components required, the complexity of operation, and the frequency and complexity of service and repairs for such known turf mowers.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

SUMMARY

In various embodiments, the present disclosure provides, a n all-electric turf vehicle, wherein the vehicle comprises a chassis; a plurality of ground engaging wheels operatively connected to the chassis, wherein at least one of the ground engaging wheels is a steerable wheel; a plurality of electric wheel drive and traction motors, wherein each electric wheel drive and traction motor is operatively connected to a respective one of the plurality of ground engaging wheels and is structured and operable to deliver motive power to the respective ground engaging wheel; a plurality of turf cutting units; and an operator station. The operator stations comprises a seat in which a vehicle operator can be seated; and a control and support arm structured and operable to be pivotally movable so that the control and support arm can be positioned to not obstruct a line of sight of the vehicle operator to an outer cutting unit.

In various other embodiments, the present disclosure provides an all-electric turf mower, wherein the turf mower comprises a chassis; a plurality of front ground engaging wheels operatively connected to the chassis, and at least one steerable rear ground engaging wheel operatively connected to the chassis. The turf mower additionally comprises a pair of electric front wheel drive and traction motors, wherein each front wheel drive and traction motor is operatively connected to a respective one of the pair of front ground engaging wheels and is structured and operable to independently deliver motive power to the respective front ground engaging wheel. The turf mower further comprises an electric rear wheel drive and traction motor operatively connected to the steerable rear ground engaging wheel and is structured and operable to independently deliver motive power to the rear ground engaging wheel, and a plurality of reel cutting units operatively connected to the chassis. The turf mower still further comprises an operator station that includes a seat in which a mower operator can be seated, wherein the seat is mounted to the mower via a seat pedestal. The operator station additionally includes a pivoting control arm mounting assembly adjustably connected to the seat pedestal and a control and support arm mounted to pivoting control arm mounting assembly. In various embodiments, the pivoting control arm mounting assembly comprises a mounting bracket mounted to the seat pedestal, and an arm mounting assembly pivotally connected to the mounting bracket such that the control and support arm can be positioned to not obstruct a line of sight of a mower operator.

In various other embodiments, the present disclosure provides an all-electric turf vehicle that comprises a chassis and a plurality of ground engaging wheels operatively connected to the chassis, wherein at least one of the ground engaging wheels is a steerable wheel. The all-electric turf vehicle additionally comprise a plurality of electric wheel drive and traction motors, wherein each electric wheel drive and traction motor is operatively connected to a respective one of the plurality of ground engaging wheels and is structured and operable to deliver motive power to the respective ground engaging wheel, a plurality of turf cutting units, and an operator station comprising a seat in which a vehicle operator can be seated. In various embodiments, the all-electric turf vehicle further comprises a controller and electronics cabinet disposed rearward of the operator station, wherein the controller and the electronics cabinet is structured and operable house one or more one or more electronic component of the vehicle and protect the one or more electronic component housed therein from debris and electromagnetic emissions.

In various other embodiments, the present disclosure provides an all-electric turf vehicle that comprises a chassis and a plurality of ground engaging wheels operatively connected to the chassis, wherein at least one of the ground engaging wheels is a steerable wheel. The all-electric turf vehicle additionally comprise a plurality of electric wheel drive and traction motors, wherein each electric wheel drive and traction motor is operatively connected to a respective one of the plurality of ground engaging wheels and is structured and operable to deliver motive power to the respective ground engaging wheel, a plurality of turf cutting units, and an operator station comprising a seat in which a vehicle operator can be seated. In various embodiments, the all-electric turf vehicle further comprises a battery bank located rearward of the operator station such that a center-of-gravity of the vehicle is approximately at a longitudinal center of the vehicle.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Figure 1:
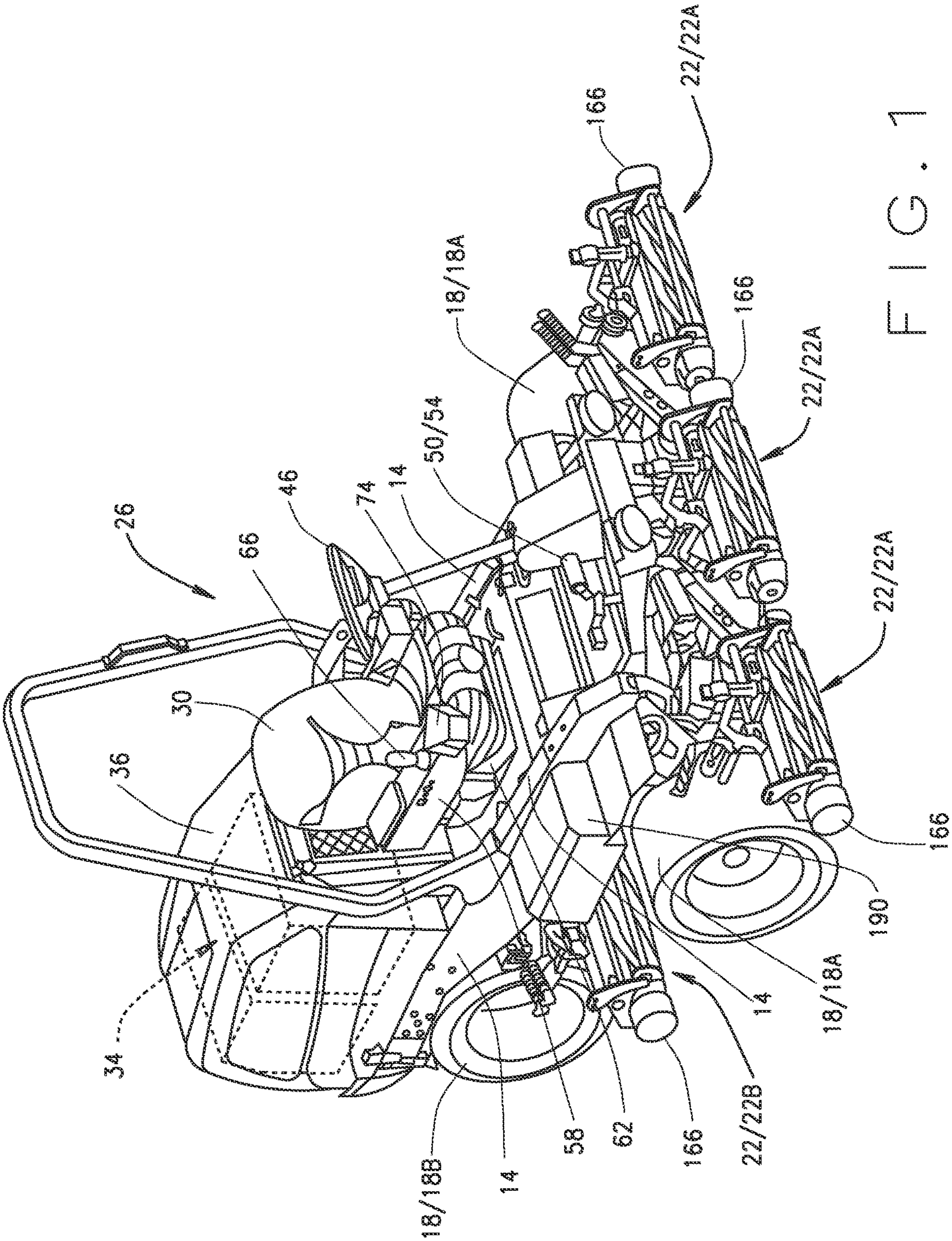
FIG. 1 is a front isometric view of an all-electric turf vehicle in accordance with various embodiments of the present disclosure.
Figure 2:
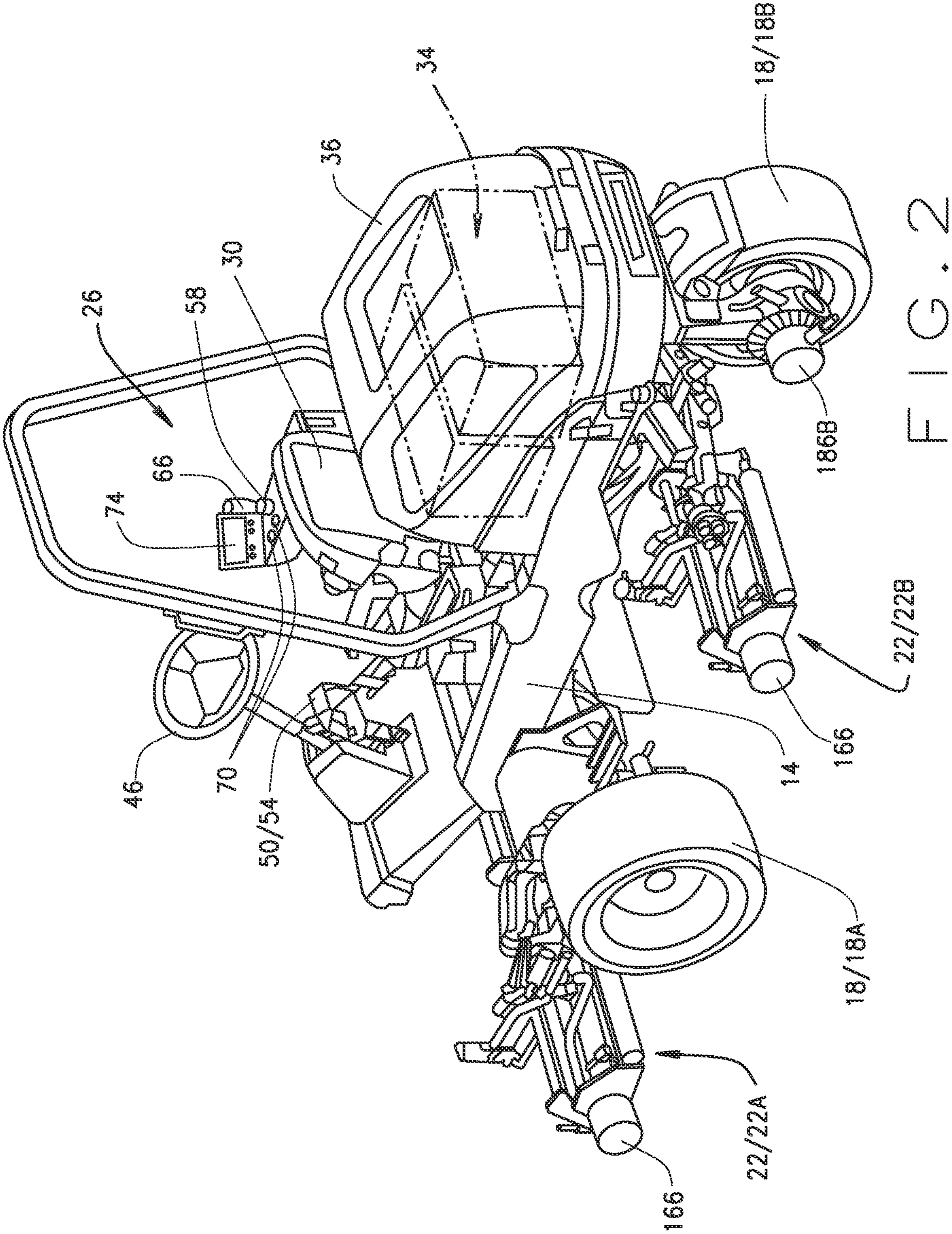
FIG. 2 is a rear isometric view of the all-electric turf vehicle shown in FIG. 1 in accordance with various embodiments of the present disclosure.
Figure 3:
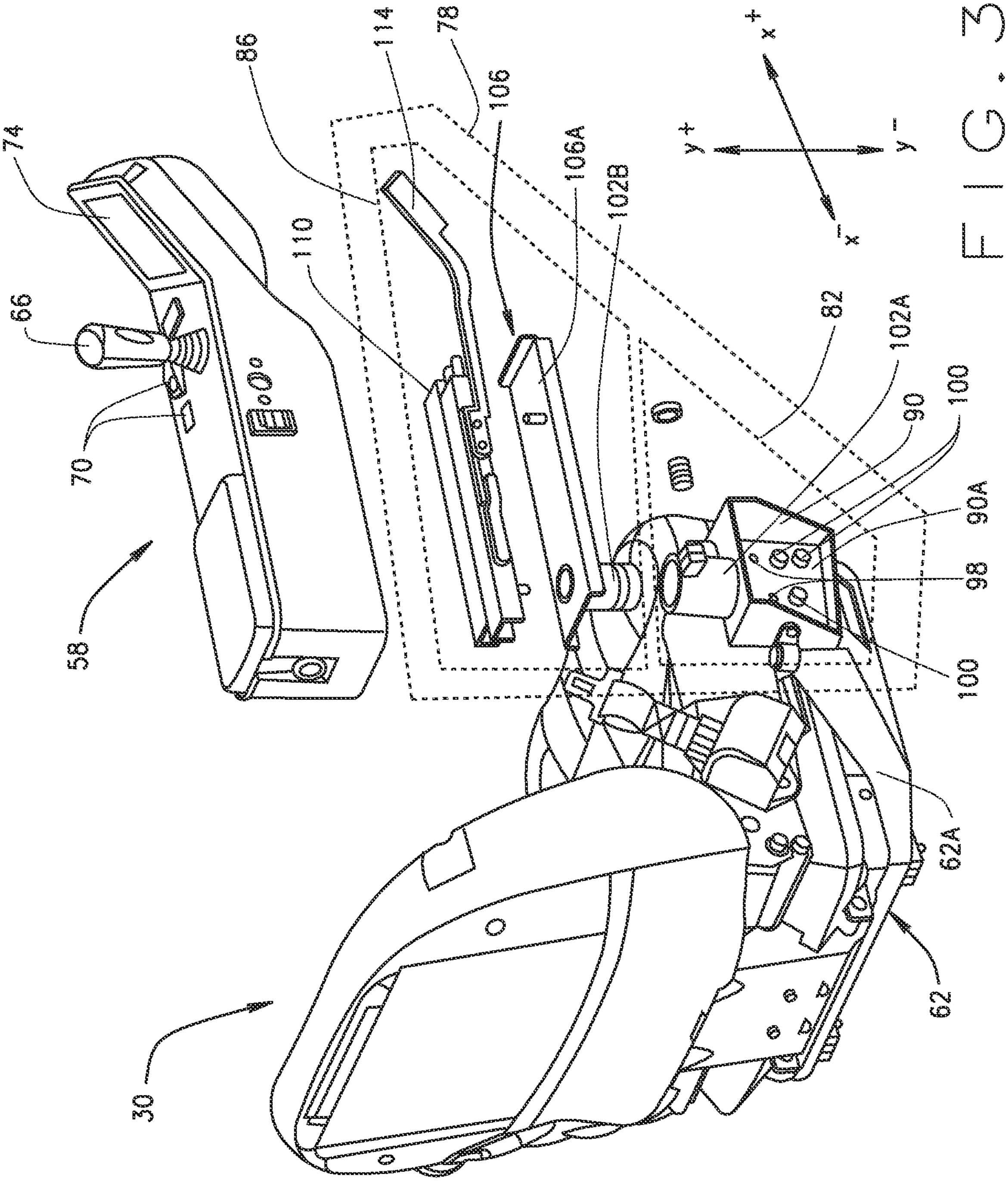
FIG. 3 is an exploded view of a seat, a control and support arm and a control arm mounting assembly of the all-electric turf vehicle shown in FIGS. 1 and 2 in accordance with various embodiments of the present disclosure.
Figure 4:
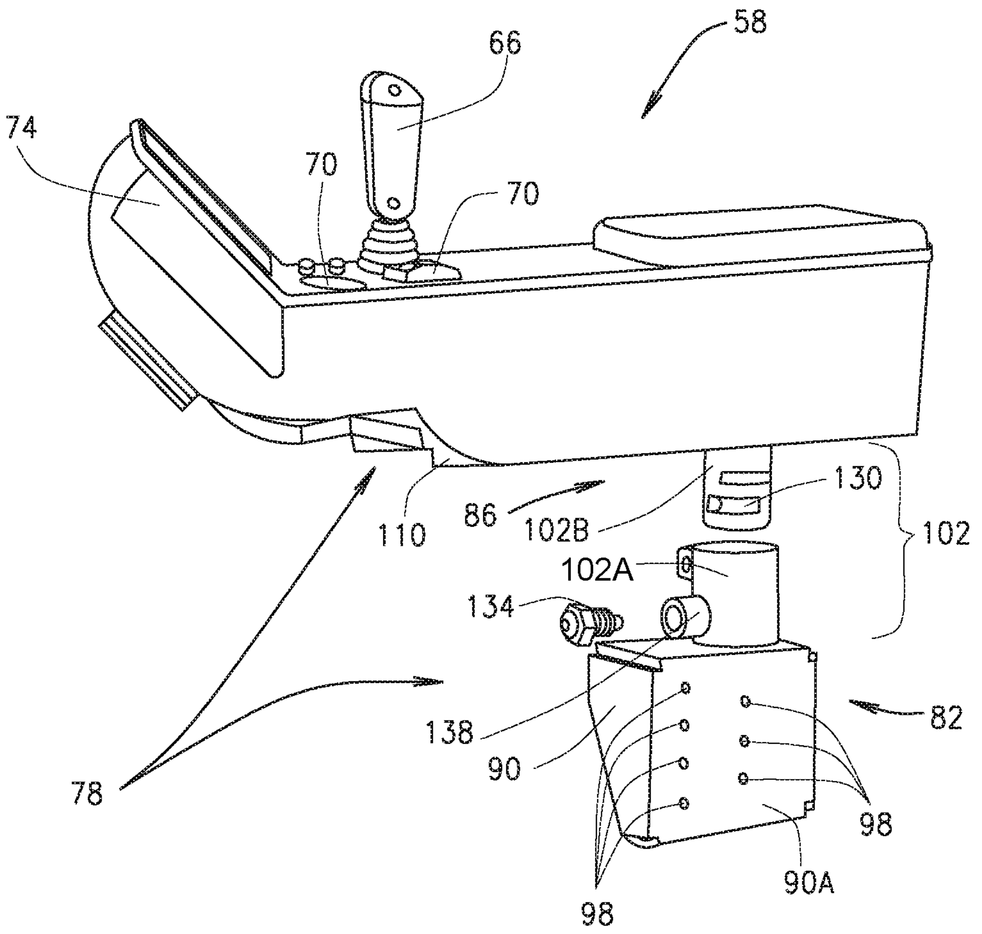
FIG. 4 is an isometric view of the control and support arm and control arm mounting assembly shown in FIG. 3 of the all-electric turf vehicle shown in FIGS. 1 and 2 in accordance with various embodiments of the present disclosure.
Figure 5:
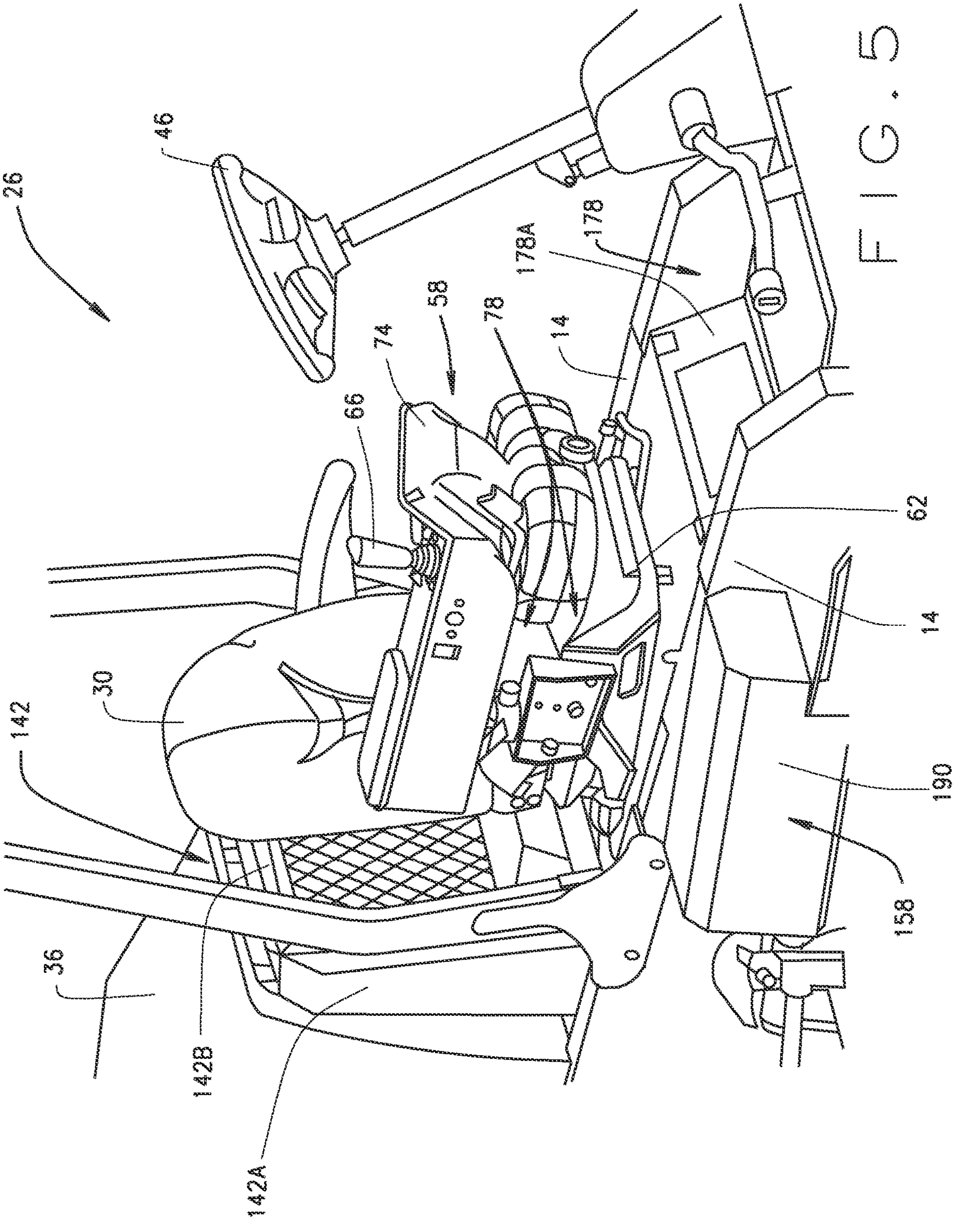

FIG. 5 is an isometric view of an operator station of the all-electric turf vehicle shown in FIGS. 1 and 2 illustrating the seat, control and support arm and control arm mounting assembly shown in FIGS. 3 and 4, and a controller and electronics cabinet located behind the operation station, and having a vehicle hood removed to show a plurality of battery banks disposed behind the controller and electronics cabinet in accordance with various embodiments of the present disclosure.

Figure 6:
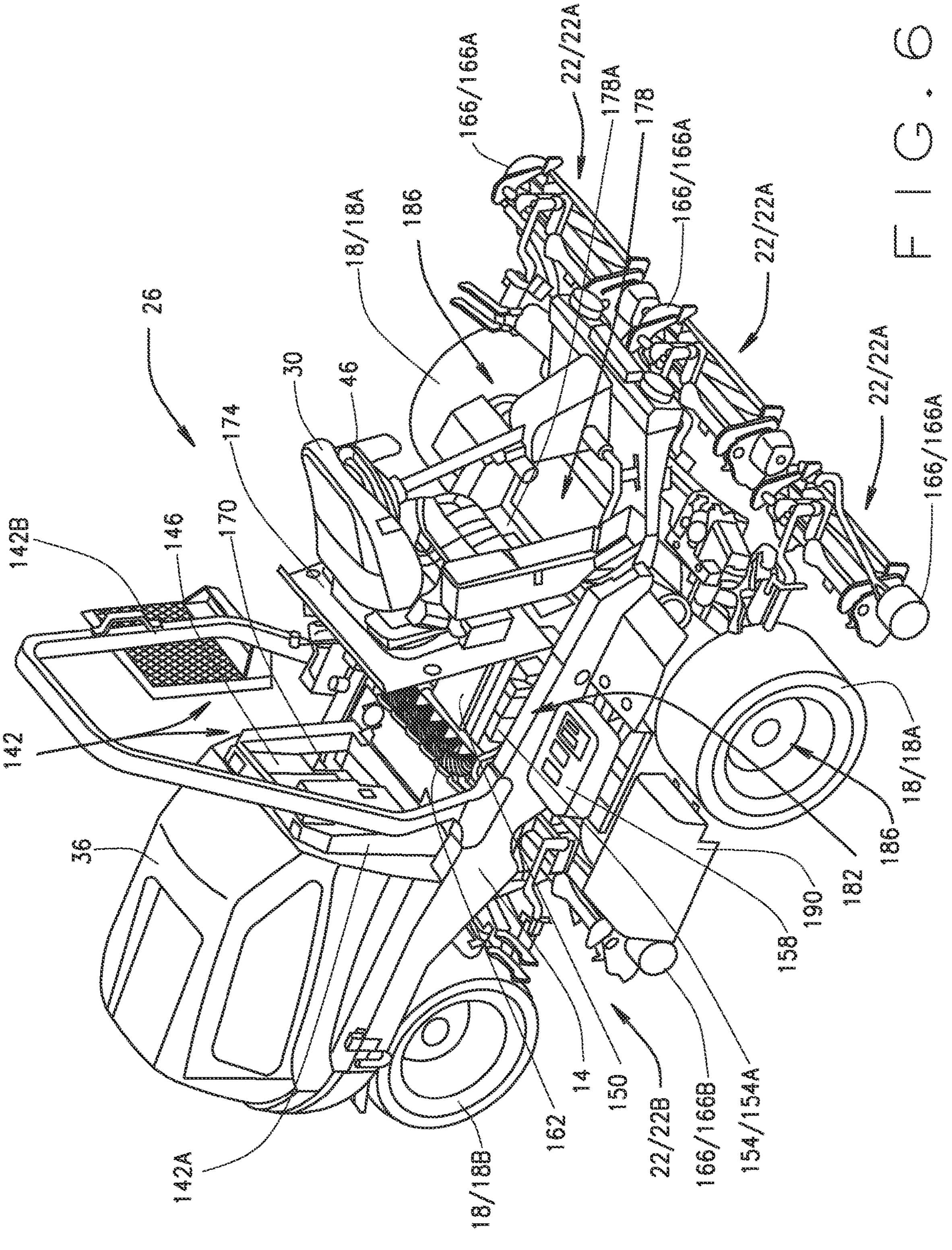

FIG. 6 is a front isometric view of the all-electric turf vehicle shown in FIGS. 1, 2 and 5 illustrating the operator seat mounted to a hinged component reservoir cover in an Open position in accordance with various embodiments of the present disclosure.

Figure 7:
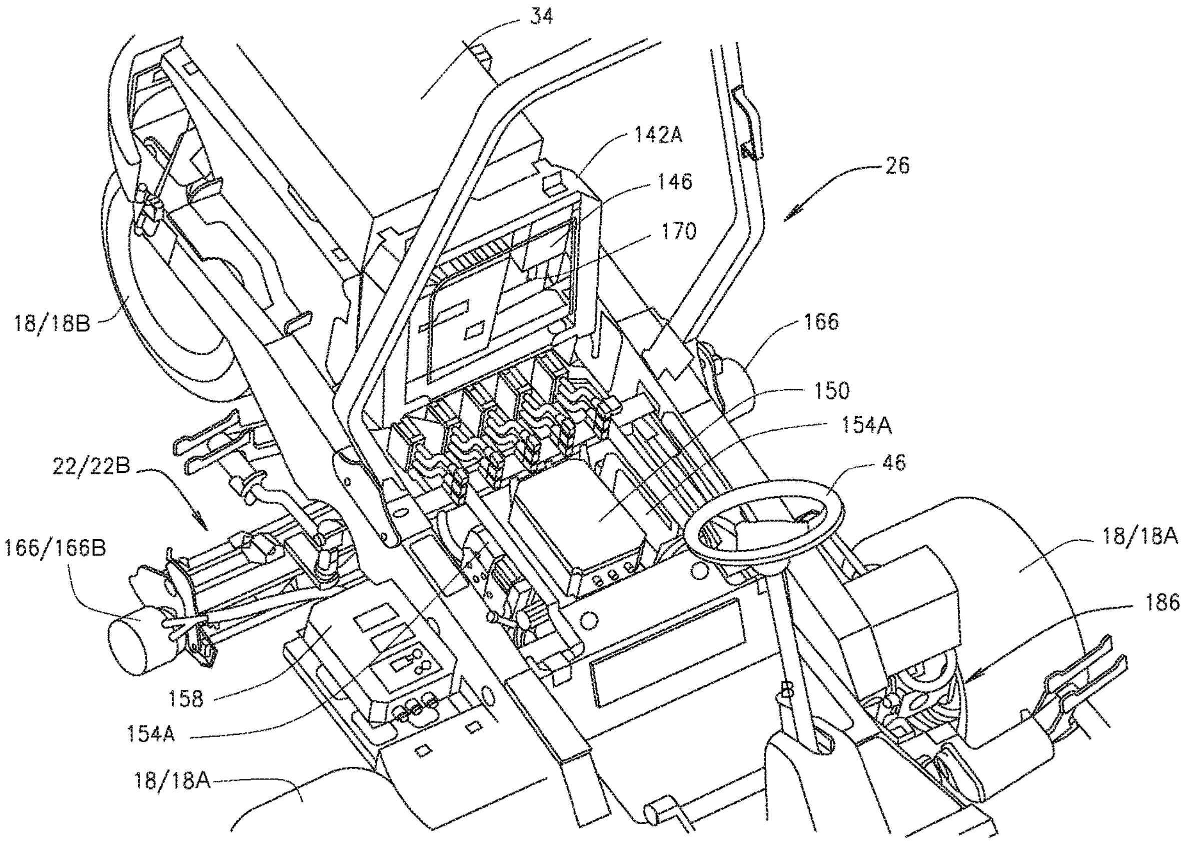

FIG. 7 is a front isometric view of the all-electric turf vehicle shown in FIGS. 1, 2, 5 and 6 illustrating a component disposed beneath the hinged component reservoir cover in accordance with various embodiments of the present disclosure.

Figure 8:
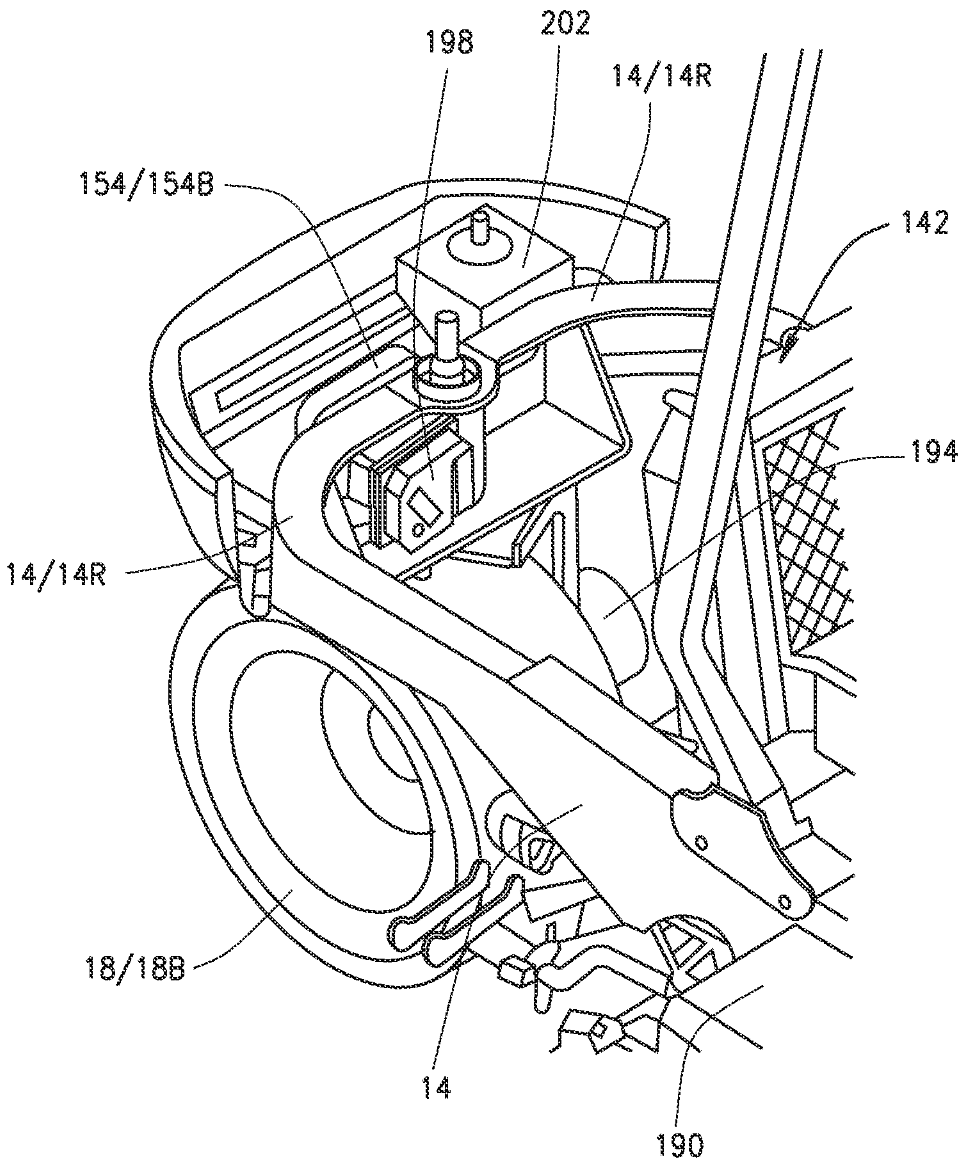

FIG. 8 is an isolated view of the rearward end of the all-electric turf vehicle shown in FIGS. 1, 2, 5, 6 and 7 having the battery bank and vehicle hood removed to show a rear traction control unit, a rear wheel drive and traction motor, and a steering control unit in accordance with various embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms “a”, “an”, and “the” may be intended to include the plural forms as well, unless the context clearly indicates otherwise. The terms “comprises”, “comprising”, “including”, and “having” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being “on”, “engaged to or with”, “connected to or with”, or “coupled to or with” another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being “directly on”, “directly engaged to”, “directly connected to”, or “directly coupled to” another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., “between” versus “directly between”, “adjacent” versus “directly adjacent”, etc.).

As used herein the phrase “operably connected to” will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts or causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Referring now to FIGS. 1 and 2, the present disclosure provides an all-electric turf vehicle 10 (e.g., a reel-type greens and/or fairway mower) that comprises a plurality of electrical components and controllers that control the operation and functionality of the electrical components. Importantly, the controllers are disposed and located on the vehicle 10 is close proximity to the respective components they control such that the electrical wiring harnesses connecting the controllers to the components have minimal lengths that minimize any voltage drop between the controllers and the respective components. It should be readily understood that the teachings of the present disclosure are not limited to the specific type of turf vehicles exemplarily described and illustrated herein and can be extended to a variety of applications in the turf care industry and elsewhere.

The vehicle 10 generally comprises a frame or chassis 14, a plurality of ground engaging wheels 18 operably connected to the frame 14 and a plurality of reel type cutting units 22 (i.e., grass and turf cutting units) operably connected to the frame 14. In various embodiments, the vehicle 10 comprises two front wheels 18A and one steerable rear wheel 18B. In various embodiments, the vehicle 10 comprises three reel-type cutting units 22, wherein each cutting unit 22 is disposed forward of a respective one of the wheels 18, Therefore, the cutting units 22 precede the wheels 18 when the vehicle 10 is traversing a ground surface such that the turf or grass (particularly on a golf green) is mowed prior to being traversed by the wheels 18, thereby ensuring a precise and consistent length of cut. The vehicle 10 also comprises an operator station 26 including a seat 30 from which an operator controls the function of the vehicle 10. Each reel cutting unit 22 is driven by an electric reel cutting unit motor 166 that is electrically connected to and is supplied electrical energy or power (e.g., voltage and current) from an onboard battery bank 34 disposed rearward of the operation station 26, e.g., behind the seat 30, and under a hood 36 of the vehicle 10. The battery bank 34 comprises a plurality of batteries 38. The battery bank 34 (e.g., the plurality of batteries 38) provides electrical power for all electrically operated motors, components, controllers and other devices of the vehicle 10, as described below.

Generally, all operator controlled operations and functionality of the vehicle 10 (e.g., operations and functionality controlled by an operator of the vehicle 10 during operation of the vehicle 10) can be controlled from the operator station 30, via a steering wheel 46, accelerator and brake pedals 50 and 54, and various system controls disposed on and in a control and support arm 58 pivotally mounted to a seat pedestal 62 and disposed alongside the seat 30 that is also mounted to the seat pedestal 62. The control and support arm 58 comprises various system controls such as a joystick 66 for controlling the operation of lifting and lowering the cutting units 22, a plurality of control buttons and switches 70 for controlling the operation of cutting unit 22 on/off, park brake on/off, lights on/off, low/high beam, and beacon on/off, and a computer-based control module 74 having a display panel and various buttons and/or keys for programming and visually monitoring such things as battery capacity, cutting unit 22 status, park brake status, machine status and diagnostics. In various embodiments the joystick 66 is structured and operable for controlling the operation of such things as the lifting and lowering of the cutting units 22. In various embodiments the plurality of control buttons and switches 70 are structured and operable for controlling the operation of such things as turning the cutting units on and off, engaging and disengaging a park brake, turning on and off the low/high beam of the headlights, turning on and off a vehicle beacon. In various embodiments the computer-based control module 74 is structured and operable for controlling the operation of such things as programming and visually monitoring the control and operation of such things as battery capacity, cutting unit status, park brake status, machine status, diagnostics, etc.

Referring now to FIGS. 1, 2, 3 and 4, the control and support arm 58 is mounted to the seat pedestal 62 via a pivoting control arm mounting assembly 78. In various embodiments, the pivoting control arm mounting assembly 78 comprises a mounting bracket 82 that is mountable to the seat pedestal 62 or any other vehicle structure in close proximity to the seat 30, and an arm mounting assembly 86 that is pivotally connected to the mounting bracket 82. The mounting bracket 82 comprises a base structure 90 having a front face 90A with a plurality of mounting holes 98 disposed therein. The mounting holes 98 align with a plurality of threaded bores (not shown) formed in an arm 62A of the seat pedestal 62 such that the base structure 90, and hence the mounting bracket 82 can be adjusted to be connected to the seat pedestal arm 62 in a plurality of height configurations relative the seat 30 in the $Y^+$ and $Y^-$ directions, via any suitable fastener 100 (e.g., bolts). The mounting bracket 82 additionally comprises a first half 102A of a swivel coupling 102 that is connected or fixed to or integrally formed with a top plate 90B of the base structure 90.

The arm mounting assembly 86 comprises a base plate 106 and a linear slide mechanism 110 that is mounted to a top face 106A of the base plate 106. The control and support arm 58 is mounted to the linear slide mechanism 110. The linear slide mechanism 110 is structured and operable to controllably allow the control and support arm 58 to linearly move forward and backward in the $X^+$ and $X^-$ direction along the length of the base plate 106 such that the operator of the vehicle 10 can ergonomically adjust the position of the control and support arm 58. In various embodiments, that linear slide mechanism 58 comprise a locking bar 114 that is structured and operable to controllably lock and unlock the operation of the linear slide mechanism such that the control and support arm 58 can be positioned and retained anywhere along the $X^+$ and $X^-$ axis relative to the base plate 106 and within the mechanical limits of the linear slide mechanism 110. For example, in various embodiments, the locking bar 114 can be moved upward in the $Y^+$ direction to unlock the linear slide mechanism 110 to allow the vehicle operator to adjust the location of the control and support arm 58 along the $X^+$ and $X^-$ axis to a desired ergonomically comfortable position. The subsequent release, or movement downward in the $Y^-$ direction of the locking bar 114 will then lock the linear slide mechanism to retain the control and support arm 58 in the desired ergonomically comfortable position. The arm mounting assembly additionally comprises a second half 102B of the swivel coupling 102 that is connected or fixed to or integrally formed with a bottom side of the arm mounting assembly base plate 106.

The swivel coupling 102 can be any coupling that is structured and operable to allow the arm mounting assembly 86 and the control and support arm 58 mounted thereto to rotate, swivel or pivot relative to the mounting bracket 82 within the $X^+$ and $X^-$ plane. It is envisioned that the swivel coupling 102 can be structured and operable to allow the arm mounting assembly 86 and the control and support arm 58 mounted thereto to rotate, swivel or pivot 360° relative to the mounting bracket 82 within the $X^+$ and $X^-$ plane, or have any limited range of rotation, e.g., 45°, 90°, 135°, 180°, etc. range of rotation. In various embodiments, the first half 102A of a swivel coupling 102 can comprise a pivot post receiving cup or sleeve that is connected or fixed to or integrally formed with a top plate 90B of the base structure 90, and the second half 102B of a swivel coupling 102 comprises a pivot post that is received by and pivotally or rotationally disposed within the pivot post receiving cup 102A. More particularly, the pivot post 102B is pivotal or rotatable within the pivot post receiving cup 102A such that the pivot post 102B can rotate, swivel or pivot 360° (or any desired limited range of rotation) within the pivot post receiving cup 102A, thereby allowing the control and support arm 58 to rotate, swivel or pivot 360° (or any desired limited range of rotation) within the $X^+$ and $X^-$ plane. In various embodiments, the swivel coupling 102 can be structured and operable such that the control and support arm 58 can be pivoted, swiveled or rotated and retained an any desired position within the 360° range of rotation (or any desired limited range of rotation). For example, as best shown in FIG. 4, in various embodiments where the swivel coupling 102 comprises the pivot post receiving cup 102A and pivot post 102B, the pivot post 102B can include a groove or detent 130 that is structured and operable to receive a distal end of a detent screw 134 that is threadably engaged with a threaded port 138 provided in the sidewall of the pivot post receiving cup 102A.

In various embodiments, the arm mounting assembly 86 is configures so the detent screw 134 is located within the groove 130, thereby preventing the pivot post 102B from coming out of the pivot post receiving cup 102A. Additionally, the detent screw 134 is threaded into the threaded port 138 until resistance is large enough to stop free rotation of the pivot post 102B within the pivot post receiving cup 102A and also prevent rotation of the pivot post 102B within the pivot post receiving cup 102A under "light" loads. However, the force or tension between the distal end of the detent screw 134 and the groove 130 is such that control and support arm 58 can be rotated, swiveled or pivoted within the $X^+$ and $X^-$ plane to a desired position of location when sufficient force is applied and then retain the control and support arm 58 in the desired position or location. In various embodiments the detent screw 134 is a "screw" having a spring disposed inside the shaft of the detent screw 134, and a ball at the end—similar to a pen. The spring applies a force on the ball keeping it in position, therefore if pushed hard enough the ball will retract into the shaft of the detent screw 134 until the point the ball is fully inside the screw rendering the screw a fixed joint. However, if the detent screw 134 is tightened/threaded within the threaded port 138 such that ball is left protruding from the shaft of the detent screw 134, the ball can then roll with in the detent 130 such that control and support arm 58 can be rotated, swiveled or pivoted within the $X^+$ and $X^-$ plane to a desired position of location when sufficient force is applied and then retain the control and support arm 58 in the desired position or location. The greater the force applied by the set screw 134 to the detent 130 the greater the required force will be to rotate, swivel or pivot within the control and support arm within the $X^+$ and $X^-$ plane Therefore, as described above, the control arm mounting assembly 78 is structured and operable to allow the control and support arm 58 to be ergonomically linearly adjusted in the $Y^+$ and $Y^-$ direction via the mounting holes 98 in the base structure front face 90A, adjusted in the $X^+$ and $X^-$ direction via the linear slide mechanism, and ergonomically rotationally or pivotally adjusted in the $X^+$ and $X^-$ plane via the swivel coupling 102. Additionally, providing the swivel coupling 102 such that the control and support arm 58 can be rotated, swiveled or pivoted outward away from the seat 30 allows the vehicle operator to position the control and support arm 58 so that the control and support arm 58 does not obstruct the vehicle operator's line of sight to an outer edge of the outermost cutting unit 22, thereby providing the vehicle operator with increased visibility and a clear line of sight of where the outer edge of the outermost cutting unit 22 is relative to ground formations (e.g., the edge of a green or the edged of a fairway) when performing perimeter cuts. With the combination of the pivoting control arm mounting assembly 78 and adjustable linear slide mechanism 110, the control and support arm 58 provides a multifunctional system that enables increased visibility whilst delivering a wide range of adjustment for ergonomic comfort.

Referring now to FIGS. 5, 6 and 7, in various embodiments the vehicle 10 comprises a controller and electronics cabinet 142 disposed rearward of the operator station 26, e.g., behind the seat 20. The controller and electronics cabinet 142 houses and provides protection for various electronic controllers and electrical systems that control the operation of various components, modules, apparatuses, motors, systems and various other electrical devices of the vehicle 10. More specifically, the controller and electronics cabinet 142 is structured and operable to provide physical protection from debris and dirt and also to provide protection from electromagnetic emissions that may interfere with the operation of the electronic controllers and electrical systems housed therein. In various embodiments the controller and electronics cabinet 142 comprises a main shroud 142A and a cover 142B removably attached to the main shroud 142A. The cover 142B is removably attached to the main shroud 142A to allow easy access to the controllers and other electrical systems housed within the controller and electronics cabinet 142 to repair, monitor, read, program, replace, etc. the controllers and other electrical systems housed therein. The cover 142B is removably attached to the main shroud 142A using any suitable fastener such as screws, threaded posts and thumb nuts, thumb screws, push fasteners, quick release quarter turn fasteners, etc. or any other type of fastener.

In various embodiments, the main shroud 142A and/or the cover 142B are fabricated of a metal or any other material that is suitable to provide physical protection of the various electronic controllers and electrical systems housed therein from flying debris. Additionally, in various embodiments the main shroud 142A and/or the cover 142B are fabricated of a metal or any other material that is suitable to provide protection from ambient electromagnetic emissions from other electrical devices located outside of the controller and electronics cabinet 142 from interfering with the operation of the various electronic controllers and electrical systems housed within the controller and electronics cabinet 142, and/or to provide protection from electromagnetic emissions from the various electronic controllers and electrical systems housed within the controller and electronics cabinet 142 from interfering with the operation of other electrical devices located outside of the controller and electronics cabinet 142. For example, in various embodiments, the mains shroud 142A and/or the cover 142B can be fabricated of steel or an acrylonitrile butadiene styrene (ABS) plastic.

In various embodiments, the controller and electronics cabinet 142 can house master control unit (MCU) 146 that is structured and operable to control communications to and from, and control the operation of, most other electronic controllers, electrical powered components and systems of the vehicle 10 such as a power distribution unit (PDU) 150, a traction control units (TCU) 154, and battery charger controller 158, a steering control unit (SCU) 162, electric reel cutting unit motors 166, etc. Additionally, in various embodiments, the controller and electronics cabinet 142 can house a fuse box 170 that contains a plurality of fuses and circuit breakers that protect all the electrical circuits of the vehicle 10.

As illustrated in FIGS. 5 and 6, in various embodiments, the seat 30 and seat pedestal 62 are mounted to a component reservoir cover 174 that is hingedly connected to a rear wall 178A of a footwell 178 of the vehicle 10 such that the seat 30 and seat pedestal 62 can be moved between a Closed position (shown in FIG. 5) and an Open position (shown in FIG. 6) to allow easy access to a component reservoir 182 located beneath the seat 30, seat pedestal 62 and component reservoir cover 174. The component reservoir 182 is structured and operable to house various electronic controllers and/or various electrical modules, components, devices and/or systems that control the operation of various components, modules, apparatuses, motors, systems and various other electrical devices of the vehicle 10. Providing the hingedly connected component reservoir cover 174 and locating various electronic controllers and electrical systems of the vehicle 10 within the component reservoir 182 centrally locates such various electronic controllers and electrical systems within the vehicle 10 relative to relative to the front and the rear of the vehicle 10, and provides easy access to such electronic controllers and electrical systems.

For example, in various embodiments, front wheel traction control units (TCUs) 154A can be disposed and mounted within the component reservoir 182 such that the front TCUs 154A are centrally located within the vehicle 10 relative to the front and the rear of the vehicle 10 (e.g., approximately equal distance from the forwardmost edge of the front reel cutting units 22A as from the rearmost edge of the frame 14). The vehicle 10 further includes a plurality of separate and independent electric wheel drive and traction motor 186 that are operatively connected to each wheel 18 and are structured and operable to independently deliver motive force to each respective wheel 18. More specifically, the plurality of independent electric wheel drive and traction motor 186 comprises electric front wheel drive and traction motors 186A operatively connected to each front wheel 18A and structured and operable to independently deliver motive force to each respective front wheel 18A, and at least one electric rear wheel drive and traction motor 186B operatively connected to the at least one rear wheel 18B and structured and operable to independently deliver motive force to each respective at least one rear wheel 18B. More specifically, each front TCU 154A is structured and operable to independently control the torque and rotational speed delivered by a respective electric front wheel drive and traction motor 186A to the respective front wheel 18A such that the torque and rotational speed of each front wheel 18A is independently controlled based on operator speed controls (e.g., accelerator pedal 50 positioning), the terrain over which the vehicle 10 is traveling and/or the direction of turn the vehicle 10 is traveling. Importantly the front TCUs 154A are located in close proximity to the electric front wheel drive and traction motors 186A such that a length of the electrical wiring harnesses (not shown but readily understood by one skilled in the art) connecting the front TCUs 154A to the front wheel drive and traction motors 186A is minimized, thereby minimizing a voltage drop between the front TCUs 154A and the electric front wheel drive and traction motors 186A. For example, in various embodiments, the front TCUs 154A are located within approximately 570 mm to 680 mm, e.g., 630 mm, of the electric front wheel drive and traction motors 186A such that the wire harnesses therebetween are 570 mm to 680 mm, e.g., 630 mm, thereby significantly reducing the voltage drop between the front TCUs 154A and the electric front wheel drive and traction motors 186A compared to the voltage drop between traction control units and front wheel drive and traction motors of known turf vehicles. Additionally, in various embodiments, the PDU 150 can also be located within the component reservoir 182. The PDU 150 is structured and operable to receive electrical power (i.e., voltage and current) from the battery bank 34 and distribute the power to the various controllers, motors and components of the vehicle 10 such as the TCUs 154, cutting unit 22 controls, the SCU 162, the MCU 146, etc. Locating the PDU 150 within the component reservoir 182 centrally locates the PDU 150 within the vehicle 10 relative to the front and rear of the vehicle 10 and provides easy access to the PDU 150 to repair, monitor, read, program, replace, etc. the PDU 150.

In various embodiments, the all-electric turf vehicle 10 can further include the battery charger controller 158 disposed on an exterior outboard side of the vehicle and centrally relative to the front and rear of the vehicle 10. The battery changer controller 158 is structured and operable to control, regulate and modulate power from a shore power source (e.g., a power source not disposed on the vehicle 10) to the batteries 38 of battery bank 34 so that the batteries 38 do not overcharge. Importantly, the battery charger controller 158 is disposed on an exterior outboard side of the vehicle and centrally relative to the front and rear of the vehicle 10 such that it is easily accessible. In various embodiments, the battery charger controller 158 is disposed within a housing 190 that is structured and operable to provide physical protection for the battery charger controller 158 from debris and dirt. The housing 190 is additionally structured and operable to provide protection from electromagnetic emissions from other electronic motors, controllers and devices of the vehicle 10 that may interfere with the operation of the battery charger controller 158, and protect the other electronic motors, controllers and devices of the vehicle 10 from electromagnetic emissions from the battery charger controller 158. In various embodiments, the housing 190 can be fabricated of a metal or any other material that is suitable to provide physical protection of the battery charger controller 158 from flying dirt and debris, and to provide protection from electromagnetic emissions from other electronic motors, controllers and devices of the vehicle 10 that may interfere with the operation of the battery charger controller 158, and protect the other electronic motors, controllers and devices of the vehicle 10 from electromagnetic emissions from the battery charger controller 158 that may interfere with the operation of the such electronic motors, controllers and devices of the vehicle 10.

Referring now to FIG. 8, in various embodiments, a rear wheel traction control unit (TCU) 154B can be disposed and mounted (directly or indirectly) to a rearward end 14R of the chassis 14 directly adjacent and in close proximity to the rear wheel 18B, and more important directly adjacent and in close proximity to a rear wheel drive and traction motor 186B. The rear TCU 154B is structured and operable to independently control the torque and rotational speed delivered by the respective electric rear wheel drive and traction motor 186B to the rear wheel 18B such that the torque and rotational speed of the rear wheel 18B is independently controlled based on operator speed controls (e.g., accelerator pedal 50), the terrain over which the vehicle is traveling and/or the direction of turn the vehicle 10 is traveling. As described above, each of the front wheels 18A are independently controlled by the respective TCU 154A. Therefore, the TCUs 154 (i.e., the front and rear TCUs 154A and 154B) are structured and operable to independently control the torque and rotational speed delivered by the respective electric front and rear wheel drive and traction motors 186A and 186B to the respective front and rear wheels 18A and 18B such that the torque and rotational speed of each front and rear wheel 18A and 18B is independently controlled based on operator speed controls (e.g., accelerator pedal 50), the terrain over which the vehicle is traveling and/or the direction of turn the vehicle 10 is traveling. Importantly the rear TCU 154B is located in close proximity to the electric rear wheel drive and traction motors 186B such that a length of the electrical wiring harnesses (not shown but readily understood by one skilled in the art) connecting the rear TCU 154B to the rear wheel drive and traction motor 186B is minimized, thereby minimizing a voltage drop between the rear TCU 154B and the electric rear wheel drive and traction motors 186B. For example, in various embodiments, the rear TCU 154B is located within approximately 440 mm to 540 mm, e.g., 490 mm, of the electric rear wheel drive and traction motor 186B, thereby significantly reducing voltage drop between the rear TCU 154B and the electric rear wheel drive and traction motors 186B compared to the voltage drop between traction control units and rear wheel drive and traction motors of known turf vehicles.

In various embodiments, the vehicle 10 further comprises a steering control unit (SCU) 198 disposed and mounted (directly or indirectly) to the rearward end 14R of the chassis 14 in close proximity to the rear TCU 154B, rear wheel 18B and a steering unit 202 also disposed and mounted (directly or indirectly) to the rearward end 14R of the chassis 14. The SCU 198 is structured and operable to receive steering commands initiated by the steering wheel 46 (in accordance with operation of the steering wheel 46 by the vehicle operator) and communicate those commands to the steering unit 202, whereby the steering unit 202 orients a direction of the rear wheel 18B in order to control the direction of travel of the vehicle 10. Importantly the SCU 198 is located in close proximity to the steering unit 202 such that a length of the electrical wiring harnesses (not shown but readily understood by one skilled in the art) connecting the SCU 198 to the steering unit 202 is minimized, thereby minimizing a voltage drop between the SCU 198 and the steering unit 202. For example, in various embodiments, the SCU 198 is located within approximately 400 mm to 500 mm, e.g., 450 mm, of the steering unit 202, thereby significantly reducing voltage drop between the SCU 198 and the steering unit 202 compared to the voltage drop between steering control units and steering units of known turf vehicles.

Referring now to FIGS. 1, 2 and 7, as described above, the vehicle 10 includes the onboard battery bank 34 comprising a plurality of batteries 38 disposed behind the seat 30 and under the hood 36 of the vehicle 10. As also described above, the battery bank 34 (e.g., the plurality of batteries 38) provides electrical power for all electrically operated motors, components, controllers and other devices of the vehicle 10, as described above. For example, in various embodiments the battery bank 34 can be structured and operable to provide between 12 volts to 96 volts of electrical energy to the motors, components, controllers and other devices of the vehicle 10. The battery bank 34 can include any type and number of batteries 38. For example, in various embodiments, the battery bank 34 can include eight to ten six-volt lead-acid batteries 38 connected in series that are structured and operable to provide 48 to 60 volts of electrical energy to the motors, components, controllers and other device of the vehicle 10. As will be appreciated by one skilled in the art, lower battery voltages can be used with smaller vehicles 10 while higher battery voltage can be used with larger vehicles 10, such as a turf vehicle 10 having more than three reel type cutting units 22. The battery bank 34 is rechargeable via a charging port (not shown) and the battery charger controller 158. The batteries 38 can be any type of battery such as lead-acid batteries, nickel cadmium (NiCad) batteries, lithium-ion (Li) or any other suitable type of battery can be used with the vehicle 10.

Additionally, in various embodiments the battery bank 34 can be located near the rear of the mower to provide weight balance across the vehicle 10. Accordingly, the battery bank 34 can be located within a length of the vehicle chassis 14 such that a center-of-gravity (COG) of the vehicle 10 is at or near a longitudinal center of the vehicle 10. That is, the COG is located approximately equidistance from a front wheel axis extending laterally through a center of the one or more front wheel 18A and a rear wheel axis extending laterally through a center of the one or more rear wheel 18B. This provides equal distribution of mass across all three wheels 18, thereby helping with slope performance, stability and traction of the vehicle 10. It is envisioned that the battery bank 34 can comprise one or more packs of batteries, wherein each pack comprises one or more of the plurality of batteries 38. For example, in various instances the batteries 38 can be aligned or configured in a single pack that includes 8 to 10 batteries 38. Or, alternatively, in various instances, the batteries 38 can be aligned or configured in two separate packs of batteries 38, wherein each pack includes two or more batteries 38. Moreover, as best illustrated in FIG. 7, the vehicle 10 is structured such that the battery bank 34 is disposed under the vehicle hood 36 has generally no other vehicle components are devices impeding access to battery bank 34. Therefore, the battery bank 34 is easily accessible for monitoring, repairing, replacing batteries 38 and removal of the battery bank 34.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. An all-electric turf vehicle, said vehicle comprising:

a chassis;

a plurality of ground engaging wheels operatively connected to the chassis, wherein at least one of the ground engaging wheels is a steerable wheel;

a plurality of electric wheel drive and traction motors, wherein each electric wheel drive and traction motor is operatively connected to a respective one of the plurality of ground engaging wheels and is structured and operable to deliver motive power to the respective ground engaging wheel;

a plurality of turf cutting units; and an operator station, the operator stations comprising:

a seat in which a vehicle operator can be seated, the seat mounted a seat pedestal; and a control and support arm pivotally mounted to the seat pedestal such that the control and support arm is structured and operable to be pivotally movable within the horizontal plane so that the control and support arm can be positioned to not obstruct a line of sight to an outer cutting unit.

2. The vehicle of claim 1, wherein the operator station further comprises a pivoting control arm mounting assembly to which the control and support arm is mounted, the pivoting control arm mounting assembly comprising:

a mounting bracket mounted to the vehicle in close proximity to the seat; and an arm mounting assembly pivotally connected to the mounting bracket such that the control and support arm can be positioned to not obstruct a line of sight to the outer cutting unit.

3. The vehicle of claim 2, wherein the arm mounting assembly comprises:

a base plate that is pivotally connected to the mounting bracket; and a linear slide mechanism mounted to the base plate and to which the control and support arm is mounted, the linear slide mechanism structured and operable to be controllably linearly movable along a length of the base plate.

4. The vehicle of claim 3, wherein the mounting bracket is adjustably mounted to the vehicle in close proximity to the seat such that a height of the control and support arm can adjusted.

5. An all-electric turf vehicle, said vehicle comprising:

a chassis;

a plurality of ground engaging wheels operatively connected to the chassis, wherein at least one of the ground engaging wheels is a steerable wheel;

a plurality of electric wheel drive and traction motors, wherein each electric wheel drive and traction motor is operatively connected to a respective one of the plurality of ground engaging wheels and is structured and operable to deliver motive power to the respective ground engaging wheel;

a plurality of turf cutting units;

an operator station comprising a seat in which a vehicle operator can be seated;

a component reservoir located beneath the seat, the component reservoir structured and operable to house one or more electronic component of the vehicle; and a component reservoir cover structured and operable to cover the component reservoir and the one or more electronic component housed therein, wherein the component reservoir cover has the seat mounted thereto and is hingedly connected to the vehicle to allow access to the one or more electronic component of the vehicle.

6. The vehicle of claim 5 further comprising a controller and electronics cabinet disposed rearward of the operator station, wherein the controller and electronics cabinet is structured and operable house one or more one or more electronic component of the vehicle.

7. An all-electric turf vehicle, said vehicle comprising:

a chassis;

a plurality of ground engaging wheels operatively connected to the chassis, wherein at least one of the ground engaging wheels is a steerable wheel;

a plurality of electric wheel drive and traction motors, wherein each electric wheel drive and traction motor is operatively connected to a respective one of the plurality of ground engaging wheels and is structured and operable to deliver motive power to the respective ground engaging wheel;

a plurality of turf cutting units;

an operator station comprising a seat in which a vehicle operator can be seated; and a battery bank located rearward of the operator station such that a center-of-gravity of the vehicle is approximately at a longitudinal center of the vehicle.

8. The vehicle of claim 7 further comprising:

a battery charger controller housing disposed on an exterior outboard side of the vehicle; and a battery charger controller disposed within the battery charger controller housing.

9. The vehicle of claim 8 further comprising a rear traction control unit mounted to a rearward end of the chassis adjacent a rear wheel drive and traction motor of the plurality of electric wheel drive and traction motors, wherein the rear traction control unit is structured and operable to independently control a torque and a rotational speed delivered by the rear wheel drive and traction motor to a rear wheel of the plurality of wheels such that a torque and a rotational speed of the rear wheel is independently controlled.

10. The vehicle of claim 9 further comprising steering control unit mounted to the rearward end of the chassis adjacent a steering unit mounted to the rearward end of the chassis, wherein the steering unit is structured and operable to control operation of the steering unit in order to control a direction of travel of the vehicle.

11. An all-electric turf mower, said mower comprising:

a chassis;

a plurality of front ground engaging wheels operatively connected to the chassis, and at least one steerable rear ground engaging wheel operatively connected to the chassis;

a plurality of electric front wheel drive and traction motors, wherein each front wheel drive and traction motor is operatively connected to a respective one of the plurality of front ground engaging wheels and is structured and operable to independently deliver motive power to the respective front ground engaging wheel;

at least one electric rear wheel drive and traction motor, wherein each of the at least one rear wheel drive and traction motor is operatively connected to a respective one of the at least one steerable rear ground engaging wheel and is structured and operable to independently deliver motive power to the respective at least one rear ground engaging wheel;

a plurality of reel cutting units operatively connected to the chassis; and an operator station, the operator stations comprising:

a seat in which a mower operator can be seated, the seat mounted to the mower via a seat pedestal; and a pivoting control arm mounting assembly adjustably connected to the seat pedestal; and a control and support arm mounted to the pivoting control arm mounting assembly, wherein the pivoting control arm mounting assembly comprises:

a mounting bracket mounted to the seat pedestal; and an arm mounting assembly pivotally connected to the mounting bracket such that the control and support arm is pivotally mounted to the seat pedestal to be pivotally movable within a horizontal plane such that the control and support arm can be positioned to not obstruct a line of sight of a mower operator.

12. The mower of claim 11, wherein the arm mounting assembly comprises:

a base plate that is pivotally connected to the mounting bracket; and a linear slide mechanism mounted to the base plate and to which the control and support arm is mounted, the linear slide mechanism structured and operable to be controllably linearly movable along a length of the base plate.

13. The mower of claim 12, wherein the mounting bracket is adjustably mounted to the seat pedestal such that a height of the control and support arm can adjusted.

14. An all-electric turf mower, said mower comprising:

a chassis;

a plurality of front ground engaging wheels operatively connected to the chassis, and at least one steerable rear ground engaging wheel operatively connected to the chassis;

a plurality of electric front wheel drive and traction motors, wherein each front wheel drive and traction motor is operatively connected to a respective one of the plurality of front ground engaging wheels and is structured and operable to independently deliver motive power to a respective one of the plurality front ground engaging wheels;

an electric rear wheel drive and traction motor operatively connected to the at least one steerable rear ground engaging wheel and is structured and operable to independently deliver motive power to the at least one rear ground engaging wheel;

a plurality of reel cutting units operatively connected to the chassis;

an operator station comprising a seat in which a vehicle operator can be seated;

a component reservoir located beneath the seat, the component reservoir structured and operable to house one or more electronic component of the mower; and a component reservoir cover structured and operable to cover the component reservoir and the one or more electronic component housed therein, wherein the component reservoir cover has the seat mounted thereto and is hingedly connected to the mower to allow access to the one or more electronic component of the mower.

15. The mower of claim 14 further comprising a controller and electronics cabinet disposed rearward of the operator station, wherein the controller and electronics cabinet is structured and operable house one or more one or more electronic component of the mower.

16. An all-electric turf mower, said mower comprising:

a chassis;

a plurality of front ground engaging wheels operatively connected to the chassis, and at least one steerable rear ground engaging wheel operatively connected to the chassis;

a plurality of electric front wheel drive and traction motors, wherein each front wheel drive and traction motor is operatively connected to a respective one of the plurality of front ground engaging wheels and is structured and operable to independently deliver motive power to a respective one of the plurality front ground engaging wheels;

an electric rear wheel drive and traction motor operatively connected to the at least one steerable rear ground engaging wheel and is structured and operable to independently deliver motive power to the at least one rear ground engaging wheel;

a plurality of reel cutting units operatively connected to the chassis;

an operator station; and a battery bank located rearward of the operator station such that a center-of-gravity of the mower is approximately at a longitudinal center of the mower.

17. The mower of claim 16 further comprising:

a battery charger controller housing disposed on an exterior outboard side of the mower; and a battery charger controller disposed with the battery charger controller housing.

18. The mower of claim 17 further comprising a rear traction control unit mounted to a rearward end of the chassis adjacent the rear ground wheel drive and traction motor, wherein the rear traction control unit is structured and operable to independently control a torque and a rotational speed delivered by the rear wheel drive and traction motor to the steerable rear ground engaging wheel such that a torque and a rotational speed of the rear ground engaging wheel is independently controlled.

19. The mower of claim 18 further comprising steering control unit mounted to the rearward end of the chassis adjacent a steering unit mounted to the rearward end of the chassis, wherein the steering unit is structured and operable to control operation of the steering unit in order to control a direction of travel of the mower.

* * * * *